United States Patent
Fry et al.

(10) Patent No.: US 7,120,593 B1
(45) Date of Patent: Oct. 10, 2006

(54) METHOD AND SYSTEM FOR ORDERING IMAGE RELATED GOODS AND SERVICES

(75) Inventors: Peter T. Fry, Nash Mills (GB); Louis A. Chauvin, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/540,148

(22) Filed: Mar. 31, 2000

(51) Int. Cl.
*G06Q 30/00* (2006.01)

(52) U.S. Cl. .................................. 705/26; 345/600

(58) Field of Classification Search .................. 705/26, 705/27; 345/600
See application file for complete search history.

(56) References Cited

U.S. PATENT DOCUMENTS

| | | | |
|---|---|---|---|
| 5,666,215 A * | 9/1997 | Fredlund et al. | 358/487 |
| 5,737,456 A * | 4/1998 | Carrington et al. | 382/299 |
| 5,784,461 A * | 7/1998 | Shaffer et al. | 380/21 |
| 5,956,716 A * | 9/1999 | Kenner et al. | 707/10 |
| 6,017,157 A * | 1/2000 | Garfinkle et al. | 396/639 |
| 6,167,382 A * | 12/2000 | Sparks et al. | 705/26 |
| 6,282,462 B1 * | 8/2001 | Hopkins | 700/259 |
| 6,304,277 B1 * | 10/2001 | Hoekstra et al. | 345/600 |
| 6,314,452 B1 * | 11/2001 | Dekel et al. | 709/203 |
| 6,321,231 B1 * | 11/2001 | Jebens et al. | 707/104 |
| 6,324,521 B1 * | 11/2001 | Shiota et al. | 705/27 |
| 6,380,967 B1 * | 4/2002 | Sacca | 348/14.01 |
| 6,393,152 B1 * | 5/2002 | Takahashi et al. | 382/233 |
| 2002/0038323 A1 * | 3/2002 | Hara et al. | 707/528 |

FOREIGN PATENT DOCUMENTS

JP 2003348424 * 12/2003

OTHER PUBLICATIONS

"Digital television high definition television." broadcast engineering, Jun. 2001, vol. 43, issue 7, p. 108, 3 pages.*
"A Portable System for High Resolution Digital Image Acquisition Using Wavelenght Image Compression." IEEE Computer Graphics and Applications, vol. 17, Issue 5, Sep.-Oct., pp. 12-14.*
Margolis, Philip E. "Computer & Internet Dictionary", Third Edition, 1999, p. 344.*
No Author, "Kodakto Unveil New System To Edit and Transmit Images", Wall Street Journal Europe, May 30, 1996, p. 4. Retrieved from Dialog File 583, Accession #: 06316792.*
Carol Levin et al. "Web photo finish: new online services for shutterbugs.", PC Magazine, v15, n19, p. 31(1), Nov. 5, 1996. Retrieved from Dialog File: 47, Accession #: 04612894.*

* cited by examiner

*Primary Examiner*—Jeffrey A. Smith
*Assistant Examiner*—Naeem Haq
(74) *Attorney, Agent, or Firm*—Thomas J. Strouse

(57) ABSTRACT

A method and system for ordering digital image goods and/or services with respect to an image provided as a low resolution digital file and a low resolution digital image file. The method includes transmitting the low resolution digital image file to a server at a remote image service provider over a communication network, manipulating the image and/or ordering of goods and/or services with respect to the image, and transmitting of the high resolution digital image file.

61 Claims, 2 Drawing Sheets

METHOD AND SYSTEM FOR ORDERING IMAGE RELATED GOODS AND SERVICES

FIELD OF THE INVENTION

The invention relates generally to the field of digital photography, and in particular to the order of goods and services over a communication network relating to digital images.

BACKGROUND OF THE INVENTION

The proliferation of digital imaging devices in the home such as digital cameras, camcorders, and home scanners has resulted in a rapid growth of the number of digital images residing on a consumers home personal computer. In addition the growth in the number of consumers connected to a network such as the World Wide Web has lead to the introduction of a number of product and service offerings in the area of digital photography. These service and product offerings rely on the consumer transmitting their image data from the home computer to the remotely located network service provider in order to produce a hardcopy print or other product or to perform some image related service.

Currently available digital cameras and home scanners have the capability of generating a high resolution digital data file of the original scene. Advances in digital cameras and scanners continually increase the resolution of the images captured and the resulting size of the data record. These high resolution data records are sufficient to produce a wide variety of image based products including enlargements, gifts, album pages, and image imprinted articles. In addition it is common for a consumer to acquire several images from a single event or to accumulate a series of images from a series of events. This accumulation of images allows the consumer to produce products or take advantage of services which involve multiple images such as an album or CD product. A consumer may also wish to accumulate a set of images before attempting to generate a series of hardcopy prints or articles simply for the convenience of performing the operation once with a set of images versus multiple times. In either case the result is that often a consumer, when accessing remotely provided imaging services and products will do so with a set of images in one transaction.

Because the product and service offerings are provided by a remote site and involve the customers images, it is necessary for the remote image service provider to have access to the digital image record\file in order to represent to the consumer the products and services. Typically the workflow for this type of interaction consists of transferring the high resolution digital record from the consumers home PC to the network photoservice provider, constructing and order for goods and services using the network photoservice provider software application and then completing the transaction. The network photoservice provider then produces the goods and services and returns the finished products to the consumer either electronically or by physical delivery. A problem, which often arises in this scenario is that the consumer is faced with a lengthy, time consuming, process of transferring one or more high resolution digital image records from their home computer to the network photoservice provider before they are able to make and specify their purchase decisions. In some cases this transfer of image data can take several hours. Many times the consumer cannot make a purchase decision until the images are manipulated and presented in a finished form. The result is that the barrier of having to upload a large amount of image data and the time investment associated with that discourages the user from initiating the purchase cycle or the time invested by the consumer in the transfer of image data to the service provider is wasted if no product or service is purchased. What is needed is a way to allow the consumer to browse and make purchase decisions on products and services, before they invest a significant amount of time in the transfer of data while maintaining their ability to view an accurate visual representation of the final goods and services.

SUMMARY OF THE INVENTION

The present invention is directed to overcoming one or more of the problems set forth above. Briefly summarized, according to one aspect of the present invention, a method for ordering digital image goods and/or services, comprising the steps of:

a. obtaining a low resolution digital image file and a high resolution digital image file of an image;

b. transmitting the low resolution digital image file to a server at a remote image photoservice provider over a communication network, the server having software for manipulating and/or for ordering of goods and/or services with respect to the image;

c. using the software with respect to the image; and d. transmitting the high resolution digital image file after using the software.

In accordance with another aspect of the present invention there is provided a method for ordering digital image goods and/or services with respect to an image provided in a low resolution digital file and a low resolution digital image file, comprising the steps of:

a. transmitting the low resolution digital image file to a server at a remote image service provider over a communication network, the server having software for manipulating and/or for ordering of goods and/or services with respect to the image;

c. using the software with respect to the image; and d. transmitting the high resolution digital image file after using the software.

In accordance with yet another aspect of the present invention there is provided a method for ordering digital image goods and/or services with respect to an image provided as a low resolution digital file and a low resolution digital image file, comprising the steps of:

a. transmitting the low resolution digital image file to a server at a remote image service provider over a communication network;

c. manipulating the image and/or ordering of goods and/or services with respect to the image; and d. after completing step c transmitting the high resolution digital image file.

In still another aspect of the present invention there is provided a system for manipulating and order of goods and/or services with respect to images provided in a digital format over a communication network, comprising:

an image provider having server capable of being connected to a communication net work;

a digital device for obtaining a high resolution digital image file and a low resolution digital image file of an image;

a remote computer capable of being connected to the server of the image provider through the communication net work, the computer capable of obtaining the high resolution digital image file and the low resolution digital image file from the digital device and forwarding the high and low digital image files to the server.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Before describing the present invention, it facilitates understanding to note that the present invention is preferably utilized on any well-known computer system, such as a personal computer via the internet. Consequently, the computer system will not be discussed in detail herein. It is also instructive to note that the images are either directly input into the computer system (for example by a digital camera) or digitized before input into the computer system (for example by scanning an original, such as a silver halide film).

Figure 1:
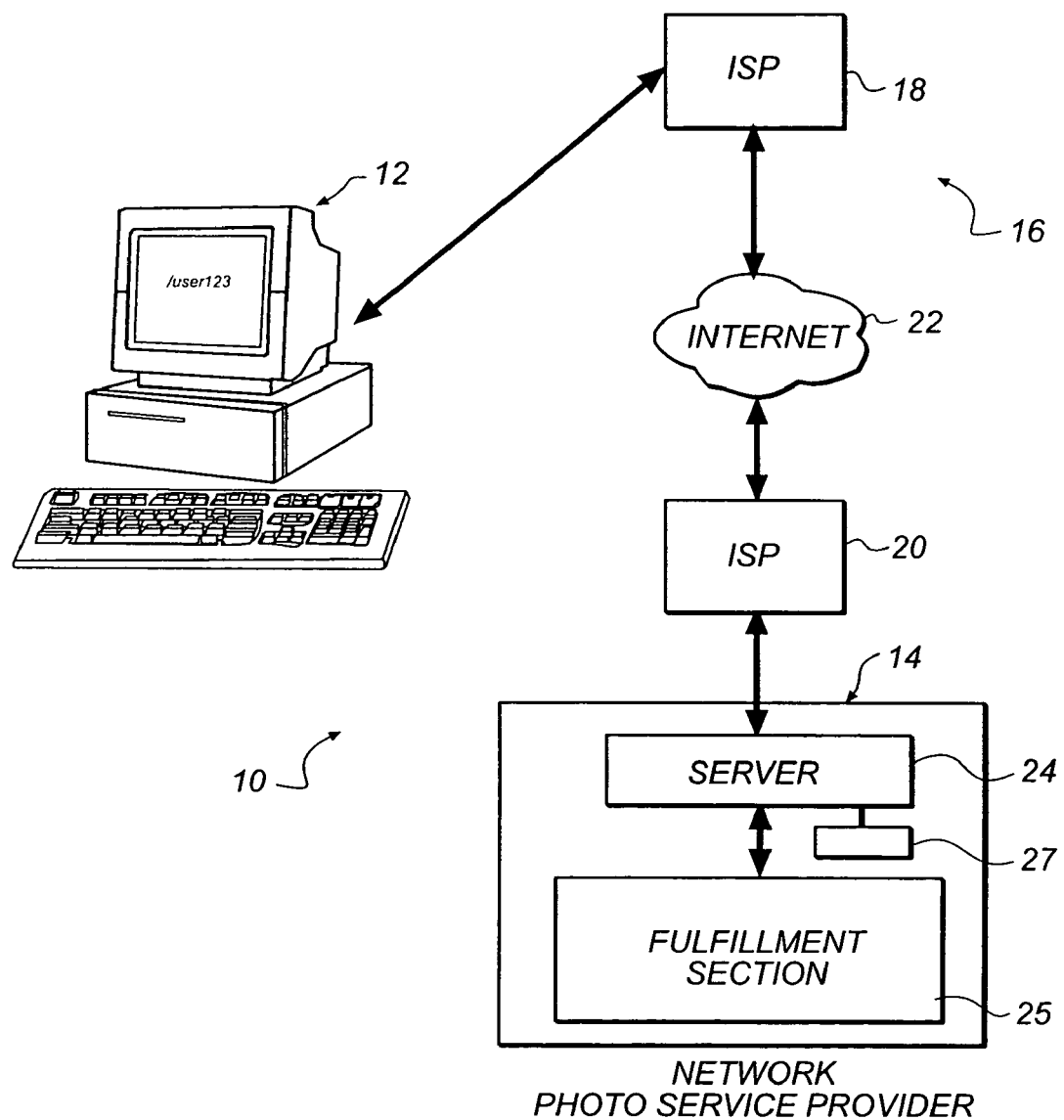
FIG. 1 is a schematic diagram of a system made in accordance with the present invention.

Referring to FIG. 1, there is illustrated a system 10 made in accordance with the present invention. The system 10 comprises computer device 12 remote from a network photoservice provider 14. The computer device 12 may be a personal computer at a customer's home or a kiosk at a retail establishment. The computer device 12 and network service provider 14 are in communication through a network communication system 16 which in the present invention illustrated includes internet service providers 18, 20 which are both connected to the internet 22. The service provider 14 includes a server 24 and a fulfillment section 25 for fulfilling of customer orders. The computer device 12, is capable of storing or accessing digital image records acquired by the device via one or more means such as reading a CD-ROM, Digital Flash-Memory Card, connection to a digital camera, connection to a digital scanner, floppy disk, or a network connection to another device. Using a software application operating on the computer device 12, the user selects one or more locally available image records and initiates a connection to the remote service provider 14 with the intent of accessing or purchasing goods or services passing a reference to the image files to the remote service provider 14. The remote service provider system then accesses and obtains from the computer device 12 to the remote service provider 14 a low resolution version of the digital image files that were previously selected by the user. The purpose of the present invention a low resolution file is an image file that can be transmitted quickly over the internet while still allowing for image analysis, manipulation and for facilitating the placement of an order for goods and services. Typically a low resolution digital image file will be no greater than about 384 by 256 pixels, or be equal to or less than about one tenth of a high resolution digital image file. Generally, the low resolution image file need only have a sufficient size for allowing image analysis and/or manipulation so that instructions can be obtained for use with the high resolution digital image file. The low resolution image files are stored on image storage device 27 and associated with an identification ID for the user or the computer device 10. These generation of the low resolution image records can be performed using common image processing techniques such as image convolution and subsampling. The generation of the low resolution versions of the image files can be performed either by software available on the computer device 12 or using software transmitted to the computer device 12 from the remote service provider 14. A common means of transmitting the necessary software from the service provider to the computer device 10 would use technologies such as scripting languages such as Visual Basic Scripts available from Microsoft Corporation, or Java Scripts available from Sun Microsystem Inc. or software programs embedded within a HTML document such as a Java™ application, an ActiveX™ control, or a Shock-Wave™ software application. Alternatively the user may browse the product and service offerings of a service provider before indicating any interest in the products or selecting any images. In this case, once the user indicates to the service provider an interest in the goods or services the service provider then initiates the transfer of low resolution image records.

At about the same time as the transfer of the low resolution image files is a transmission of image record meta data which contains information about each of the image files from the computer device 12 to the remote service provider 14. The low resolution versions of the image records combined with the meta data files are substantially smaller in the amount of data and are transferred in a fraction of the time necessary to transfer the high resolution image files. For example transmission times of less than one tenth, and frequently up to one twentieth, can be obtain. Once all of the low resolution image records and meta data have been transferred to the remote service provider 14 the remote service provider 14 displays a positive indication on the display screen of computer device 12 that the data has been transferred.

The user of computer device 12 interacts with a software application on the remote service provider 14 to browse and shop for products and services which involve the use of the image files. In this process the user may manipulate and select one or more products or services to purchase. In this interaction the remote service provider software application can accurately display the visual results of various image manipulations using the low resolution image records. This WYSIWYG (what you see is what you get) type display is important to allow the user to see visually what the finished product or service will be. The type of effects and services that a user may want to view include, image cropping and enhancement results when selecting hardcopy prints in various sizes and aspect ratios, the results of image imprinting on a variety of physical articles such as mouse pads, mugs, fabrics, objects and the like. In addition products such as greeting cards, collages, album pages, books, interactive CD-ROMs and, video sequences could be displayed using the low resolution images. In addition to specific products and services that the user may request of the service provider the service provider may generate alternatives suggestions of products and services and display a representation of these products and services using the low resolution image records.

The meta data transferred allows the service provider to provide additional feedback to the user or to perform automatic operations on the image records. Examples of the type of feedback that could be provided include warnings that the image data available is insufficient to produce at an expected quality level the requested product or service. Or that the image data available requires or would benefit from image enhancement or processing steps. Additionally the service provider 14 may indicate that the selected images are not suitable for the requested operation due to copyright or ownership restrictions. Further, the service provider can perform specialized processing of the image records by knowing the source of the image records as communicated in the meta data. Customized processing such as image sharpening, contrast and brightness adjustment, color balancing, tone scale adjustment, can all be performed based on the meta data provided or upon analysis of the low resolution digital image file transmitted.

As is common in Internet Shopping interactions, following the selection of goods and services the user provides information to the service provider such as shipping address, billing address, credit card or commerce information and contact information using a secure communication method. At the conclusion of this purchase sequence the user approves the purchase of the selected products. Once approved the remote service provider system then initiates the transfer of each of the high resolution image records which are needed to complete the fulfillment of the goods and services. Since the user has completed all of the interactions with the service necessary to specify and approve the transaction the computer device 12 and the remote service provider 14 may operate unattended to accomplish the transfer of high resolution image records and the user is free to either leave the system or to perform other operations on the computer device 12. During this lengthy image data transfer operation the system also provides the ability to pause the transfer operation and continue at a future time, or to recover from transmission or communication errors. This interruption of data transfer is then resumed without the need to retransmit any data which was previously successfully transmitted. This ability to interrupt or to recover from errors provides a substantial advantage to the user by preventing the retransmission of data and minimizing the time invested by the user in completing the order transaction.

Figure 2:
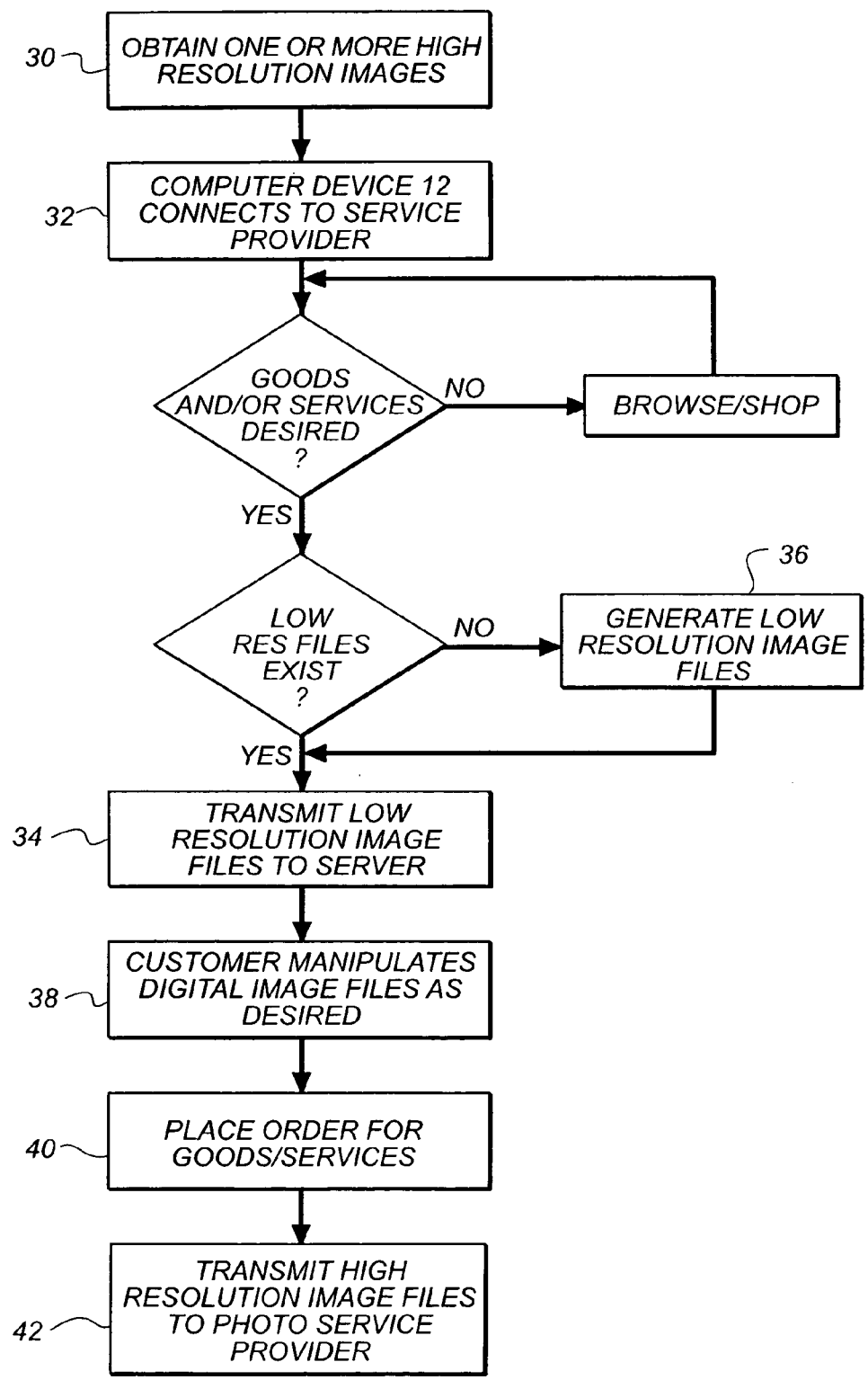
FIG. 2 is flow chart illustrating a method according to the present invention.

In order to more clearly understand the present invention a description on the operation of the method will now be discussed. Referring to FIG. 2 there is illustrated a flow chart of the method according to the present invention. The first step 30 is that one or more high resolution images are obtained. These image may of course be obtained from any appropriate source. The next step 32 would comprise the computer device 12 initiating a communication link with the service provider 14. At this point the customer using computer device 12 may or may not know what goods and/or services that are desired. If the customer knows what goods and/or services desired, low resolution image file of the desired images are transmitted at step 34 to server 24. The low resolution images may have already been generated, or may be generated at step 36 at the time of transmitting of the low resolution image files. The next step 38 is that the customer manipulates the digital image files as desired and/or as is allowed by the software at the service provider 14. An advantage of using software located at the network service provider 14, it that the network photoservice provider may have more sophisticated and up to date software. After completion of any desired manipulations, an order for goods and/or services at step 40 is placed with the network photoservice provider 14. Then at step 42 the high resolution digital image files are transmitted to the server 34. At this time the customer is free to do other things either on the computer device 12 or some where else. The important aspect, is that the customer no longer need to wait to do any further transaction.

The invention has been described with reference to a preferred embodiment. However, it will be appreciated that variations and modifications can be effected by a person of ordinary skill in the art without departing from the scope of the invention.

The invention has been described in detail with particular reference to certain preferred embodiments thereof, but it will be understood that variations and modifications can be effected within the spirit and scope of the invention.

What is claimed is:

1. A method for ordering digital image goods and/or services by a user over a communication network, comprising the steps of:
   a. said user obtaining a low-resolution digital image file, a high-resolution digital image file, and associated meta data of an image;
   b. transmitting said low resolution digital image file and said associated meta data which contains information about the high-resolution digital image file by said user from a first location to a server at a remote image photoservice provider at a second location over said communication network, said server having software for manipulating and for ordering of goods and/or services by said user with respect to said image;
   c. said user using said software on said server at said first location with respect to said low resolution digital image file;
   d. said service provider providing feed back to said user based on said meta data and said user using said software with respect to said low resolution digital image file; and
   e. said user transmitting the high-resolution digital image file from said first location to said service provider at said second location after using said software for use in fulfillment of said goods and/or services.

2. A method according to claim 1 wherein said communication network comprises the internet.

3. A met according to claim 1 wherein said using said software comprises viewing of said image on a display device using said low resolution digital image file.

4. A method according to claim 3 wherein said using said software further comprises manipulating of said image.

5. A method according to claim 3 wherein said using said software comprises placing an order for goods and/or services with respect to said image.

6. A method according to claim 5 wherein said remote image photoservice provider fulfills said order.

7. A method according to claim 1 wherein said remote image photoservice provider comprises a photofinisher.

8. A method according to claim 1 wherein said transmission of high resolution may be interrupted and resumed at the same place where the transmission was interrupted.

9. A method according to claim 1 wherein said meta data comprises information about the image files.

10. A method according to claim 1 wherein said feed back comprises information regarding customizing processing that can be preformed.

11. A method according to claim 1 wherein said feed back comprises a warning the image data available is insufficient to produce an expected quality level for a requested product or service.

12. A method according to claim 1 wherein said feed back comprises a statement that the image can benefit from image enhancement.

13. A method according to claim 1 wherein said feed back comprises said images are not suitable for a requested operation.

14. A method according to claim 1 wherein said meta data comprises information about the image files.

15. A method for ordering digital image goods and/or services by a user over a communication network with respect to an image provided in a low resolution digital file and a high resolution digital image file, said image also having associated meta data which contains information about the high-resolution digital image file, comprising the steps of:
   a. said user transmitting said low resolution digital image file and said associated meta data by a user from a first location to a server at a remote image service provider at a second location over said communication network, said server having software for manipulating and for ordering of goods and/or services by said user with respect to said image;
   b. said user using said software on said server at said first location with respect to said low resolution digital image file;
   c. said service provider providing feed back to said user based on said meta data and said user using said software with respect to said low resolution digital image file; and
   d. said user transmitting the high resolution digital image file from said first location to said service provider after said user is finished using said software for use in fulfillment of said goods and/or services.

16. A method according to claim 15 wherein said communication network comprise the internet.

17. A method according to claim 16 wherein said using said software comprises viewing of said image using on a display device using said low resolution digital image file.

18. A method according to claim 17 wherein said using said software further comprises manipulating of said image.

19. A method according to claim 17 wherein said using said software comprises placing of an order for goods and/or services with respect to said image.

20. A method according to claim 19 wherein said remote image service provider fulfills said order.

21. A method according to claim 15 wherein said remote image service provider comprises a photofinisher.

22. A method according to claim 15 wherein said transmission of high resolution may be interrupted and resumed at the same place where the transmission was interrupted.

23. A method according to claim 15 wherein said feed back comprises information regarding customizing processing that can be preformed.

24. A method according to claim 15 wherein said feed back comprises a warning the image data available is insufficient to produce an expected quality level for a requested product or service.

25. A method according to claim 15 wherein said feed back comprises a statement that the image can benefit from image enhancement.

26. A method according to claim 15 wherein said feed back comprises said images are not suitable for a requested operation.

27. A method for ordering digital image goods and/or services by a user over a communication network with respect to an image provided as a low resolution digital file and a high resolution digital image file, said image also having associated meta data which contains information about the high-resolution digital image file, comprising the steps of:
   a. said user transmitting said low resolution digital image file and said meta data to a server at a remote image service provider over a communication network, said server having software for manipulation of a digital image;
   b. said user using said software at said service provider manipulating said image and ordering of goods and/or services with respect to said image;
   c. said service provider providing feed back to said user based on said meta data and said user using said software; and
   d. after completing step c said user transmitting said high resolution digital image file to said server for use in fulfillment of said goods and/or services.

28. A method according to claim 27 wherein said communication network comprises the internet.

29. A method according to claim 27 wherein said using said software comprises viewing of said image on a display device using said low resolution digital image file.

30. A method according to claim 29 wherein said using said software further comprises manipulating of said image.

31. A method according to claim 29 wherein said using said software comprises placing an order for goods and/or services with respect to said image.

32. A method according to claim 31 wherein said remote image photoservice provider fulfills said order.

33. A method according to claim 27 wherein said remote image photoservice provider comprises a photofinisher.

34. A method according to claim 27 wherein said transmission of high resolution may be interrupted and resumed at the same place where the transmission was interrupted.

35. A method according to claim 27 wherein said meta data comprises information about the image files.

36. A method according to claim 27 wherein said feed back comprises information regarding customizing processing that can be preformed.

37. A method according to claim 27 wherein said feed back comprises a warning the image data available is insufficient to produce an expected quality level for a requested product or service.

38. A method according to claim 27 wherein said feed back comprises a statement that the image can benefit from image enhancement.

39. A method according to claim 27 wherein said feed back comprises said images are not suitable for a requested operation.

40. A system for manipulating and order of goods and/or services with respect to images provided in a digital format over a communication network, comprising:
   an image provider having a server at a first location capable of being connected to a remote user computer at a second location over a communication network, said server allowing the receiving of a high resolution digital image file, a low resolution digital image file, and associated meta data of an image from said remote user computer, said meta data containing information about the high-resolution image file, said server having software for manipulating and for ordering of goods and/or services by said user on said remote user computer with respect to said image, said user using said software on said server with respect to said low resolution image file of said image at said first location, said service provider providing feed back to said user based on said meta data and said user using said software with respect to said low resolution image file prior to receiving said high resolution digital image file, transmitting said high resolution digital image file being transmitted to said server after completion of manipulation and/or ordering of goods by said user with respect to said low resolution digital image file for use in fulfillment of said goods and/or services.

41. A system according to claim 40 wherein said high resolution digital image file, low resolution digital image file and associated meta data is received from a digital device.

42. A system according to claim 41 wherein said digital device comprises a scanner for capturing a high resolution digital image file of said image.

43. A system according to claim 41 wherein said digital device comprises a digital memory device having a high resolution digital image file of said image.

44. A system according to claim 41 wherein said digital device comprises a camera memory device having a high resolution digital image file of said image.

45. A system according to claim 41 wherein said digital device comprises a CD having a high resolution digital image file of said image.

46. A system according to claim 41 wherein said digital device comprises a computer memory storage disc having a high resolution digital image file of said image.

47. A system according to claim 41 wherein said low resolution digital image file comprises an digital image having a resolution no greater than about 200 pixels by 150 pixels.

48. A system according to claim 41 wherein said high resolution digital image file comprises an digital image file having a resolution no less than about 780 pixels by 560 pixels.

49. A system according to claim 41 wherein said low resolution digital image file is no greater than about 50% of the high resolution digital image file.

50. A method for ordering digital image goods and/or services by a user from a remote service provider over a communication network with respect to an image provided as a low resolution digital file and a high resolution digital image file, said image captured by a user and having associated meta data, said meta data containing information about the high-resolution image file, comprising the steps of:
   a. said remote image service provider receiving at a server said low resolution digital image file and said meta data of said image from said user over said communication network, said server having software for allowing manipulation of digital images;
   b. said server allowing said user using said software provided by said server to manipulate said image and ordering of goods and/or services with respect to said image over a communication network;
   c. said service provider providing feed back to said user based on said meta data and said user using said software; and
   d. said service provider obtaining said high resolution digital image file after completing step c for use in fulfillment of said goods and/or services.

51. A method according to claim 50 wherein said communication network comprises the internet.

52. A method according to claim 50 wherein said using said software comprises viewing of said image on a display device using said low resolution digital image file.

53. A method according to claim 52 wherein said using said software further comprises manipulating of said image.

54. A method according to claim 52 wherein said using said software comprises placing an order for goods and/or services with respect to said image.

55. A method according to claim 50 wherein said remote image photoservice provider comprises a photofinisher.

56. A method according to claim 55 wherein said remote image photoservice provider fulfills said order.

57. A method according to claim 50 wherein said meta data comprises information about the image files.

58. A method according to claim 50 wherein said feed back comprises information regarding customizing processing that can be preformed.

59. A method according to claim 50 wherein said feed back comprises a warning the image data available is insufficient to produce an expected quality level for a requested product or service.

60. A method according to claim 50 wherein said feed back comprises a statement that the image can benefit from image enhancement.

61. A method according to claim 50 wherein said feed back comprises said images are not suitable for a requested operation.

* * * * *